US009571806B2

United States Patent
Yukumoto et al.

(10) Patent No.: US 9,571,806 B2
(45) Date of Patent: Feb. 14, 2017

(54) PROJECTION SYSTEM, AND INFORMATION PROCESSING APPARATUS

(71) Applicants: Reiji Yukumoto, Kanagawa (JP); Noritada Ohi, Saitama (JP)

(72) Inventors: Reiji Yukumoto, Kanagawa (JP); Noritada Ohi, Saitama (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/065,639

(22) Filed: Mar. 9, 2016

(65) Prior Publication Data

US 2016/0277720 A1 Sep. 22, 2016

(30) Foreign Application Priority Data

Mar. 19, 2015 (JP) ................. 2015-055588

(51) Int. Cl.
*H04N 9/31* (2006.01)
*H04N 3/223* (2006.01)

(52) U.S. Cl.
CPC .......... *H04N 9/3194* (2013.01); *H04N 9/3147* (2013.01); *H04N 9/3185* (2013.01)

(58) Field of Classification Search
CPC ...... H04N 9/3194; H04N 9/31; H04N 9/3147; H04N 9/317; H04N 9/3176; H04N 9/3185; H04N 5/74; H04N 17/002; H04N 17/00; G06T 7/004; G06T 2207/30241
USPC ................ 348/744, 747, 806, 189, 187, 180
See application file for complete search history.

(56) References Cited

U.S. PATENT DOCUMENTS

| 2013/0108104 A1* | 5/2013 | Sonoda | B25J 9/1612 |
| | | | 382/103 |
| 2015/0077573 A1 | 3/2015 | Ishikawa et al. | |
| 2015/0206325 A1* | 7/2015 | Furihata | G06T 7/0057 |
| | | | 382/154 |

FOREIGN PATENT DOCUMENTS

| JP | 2006-304100 A | 11/2006 |
| JP | 2015-056834 A | 3/2015 |

\* cited by examiner

*Primary Examiner* — Sherrie Hsia
(74) *Attorney, Agent, or Firm* — Oblon, McClelland, Maier & Neustadt, L.L.P.

(57) ABSTRACT

A projection system includes image projection apparatuses to project one image onto a projection face based on image information, a projection controller to divide the image information into a plurality of segment image data, and to instruct each of the image projection apparatuses to project corresponding segment image data, a positional deviation detector disposed at each of the image projection apparatuses to detect a positional deviation at the image projection apparatuses, an identification unit to identify which image projection apparatus requires a calibration processing; a projection unit to cause the identified image projection apparatus to project a calibration image information; an image capture apparatus to capture the calibration image information; and a calibration unit to calibrate the segment image data projected by the identified image projection apparatus based on the captured calibration image information.

8 Claims, 10 Drawing Sheets

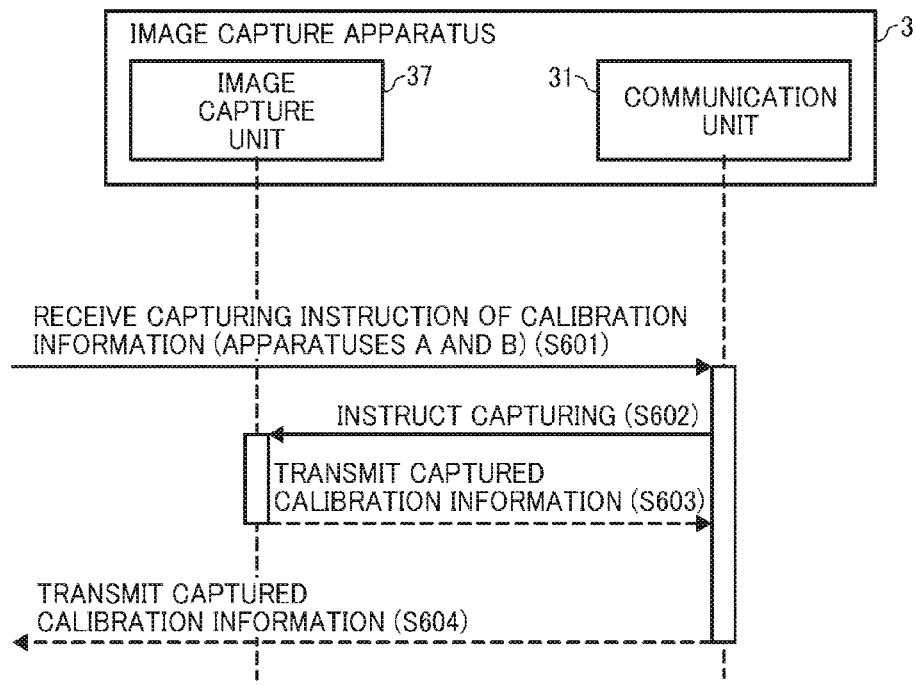
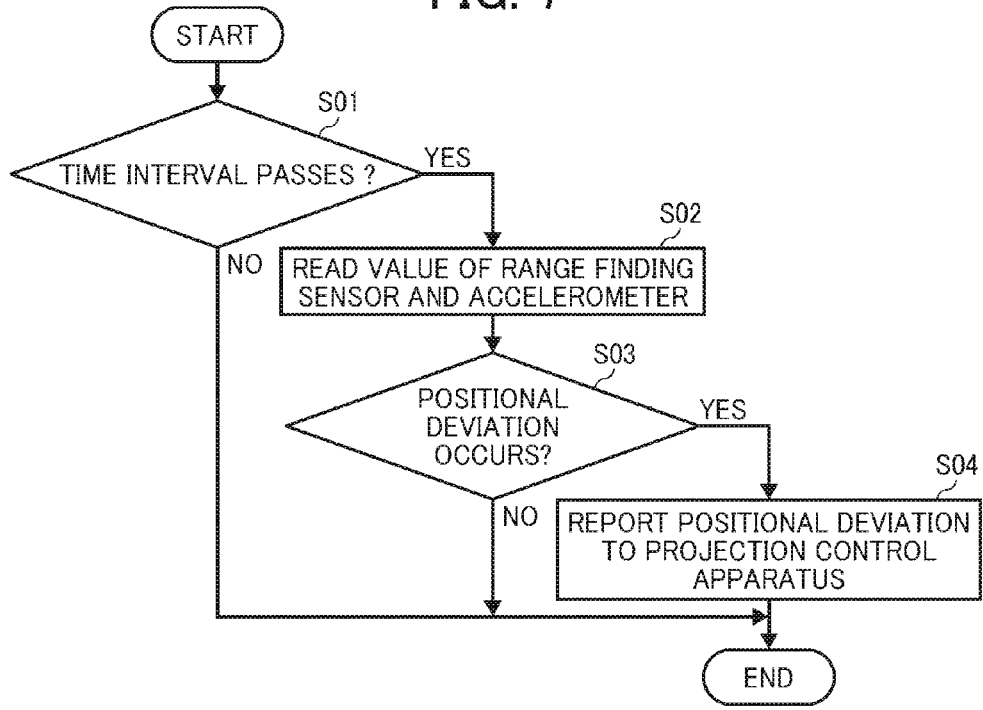

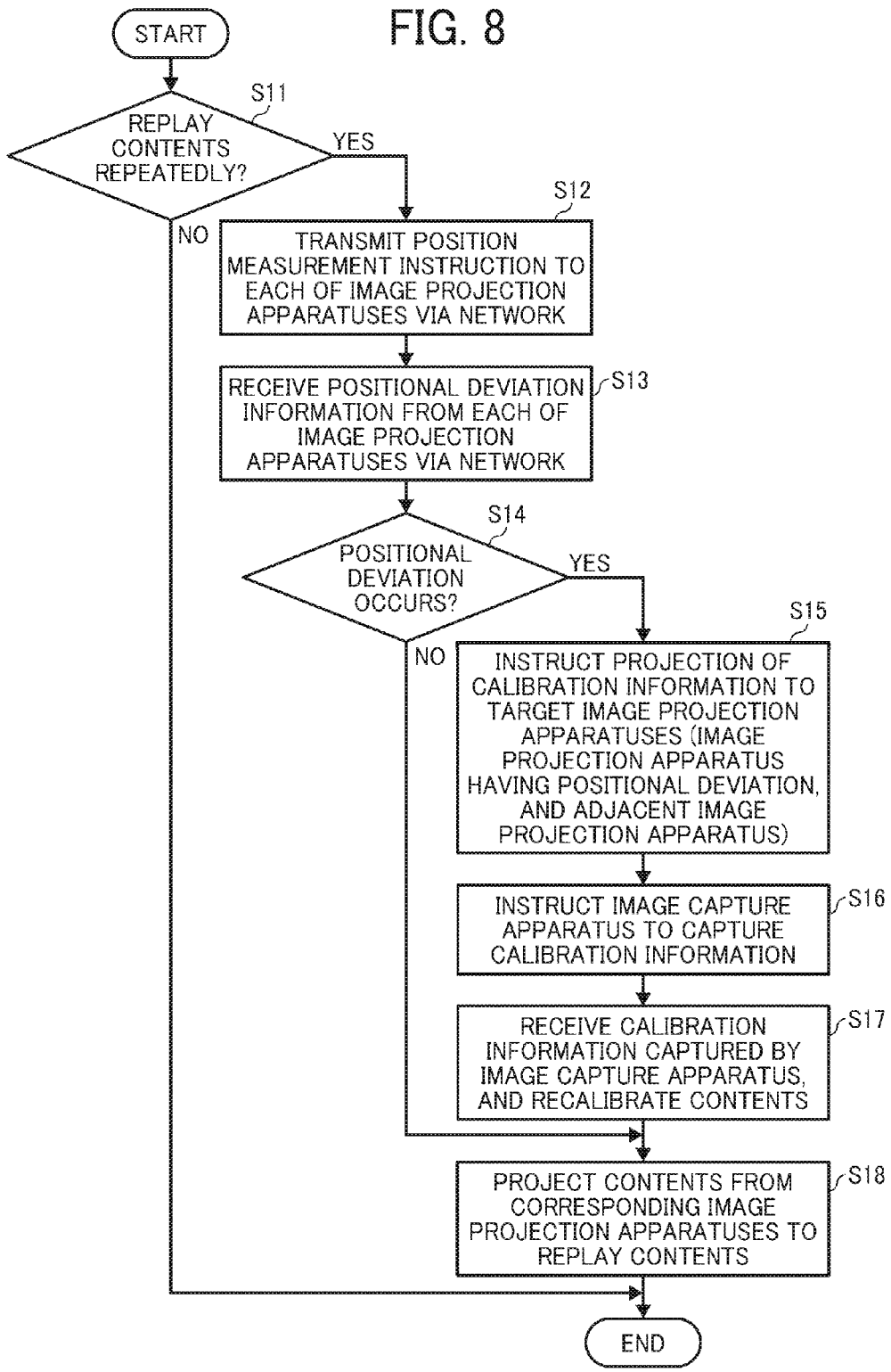

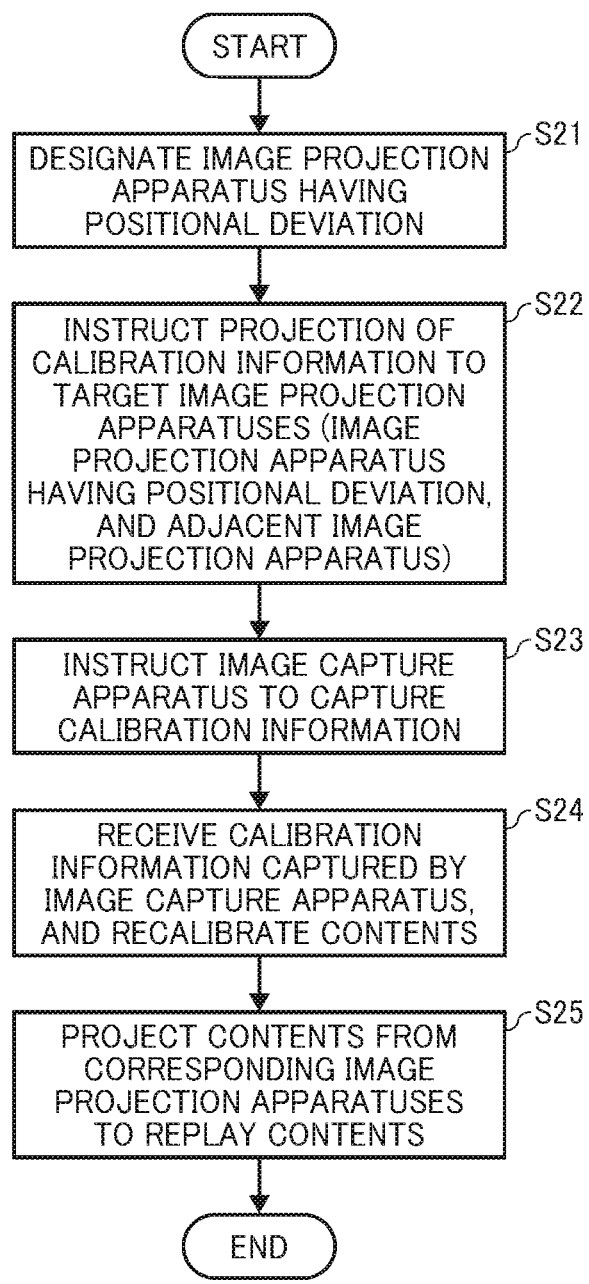

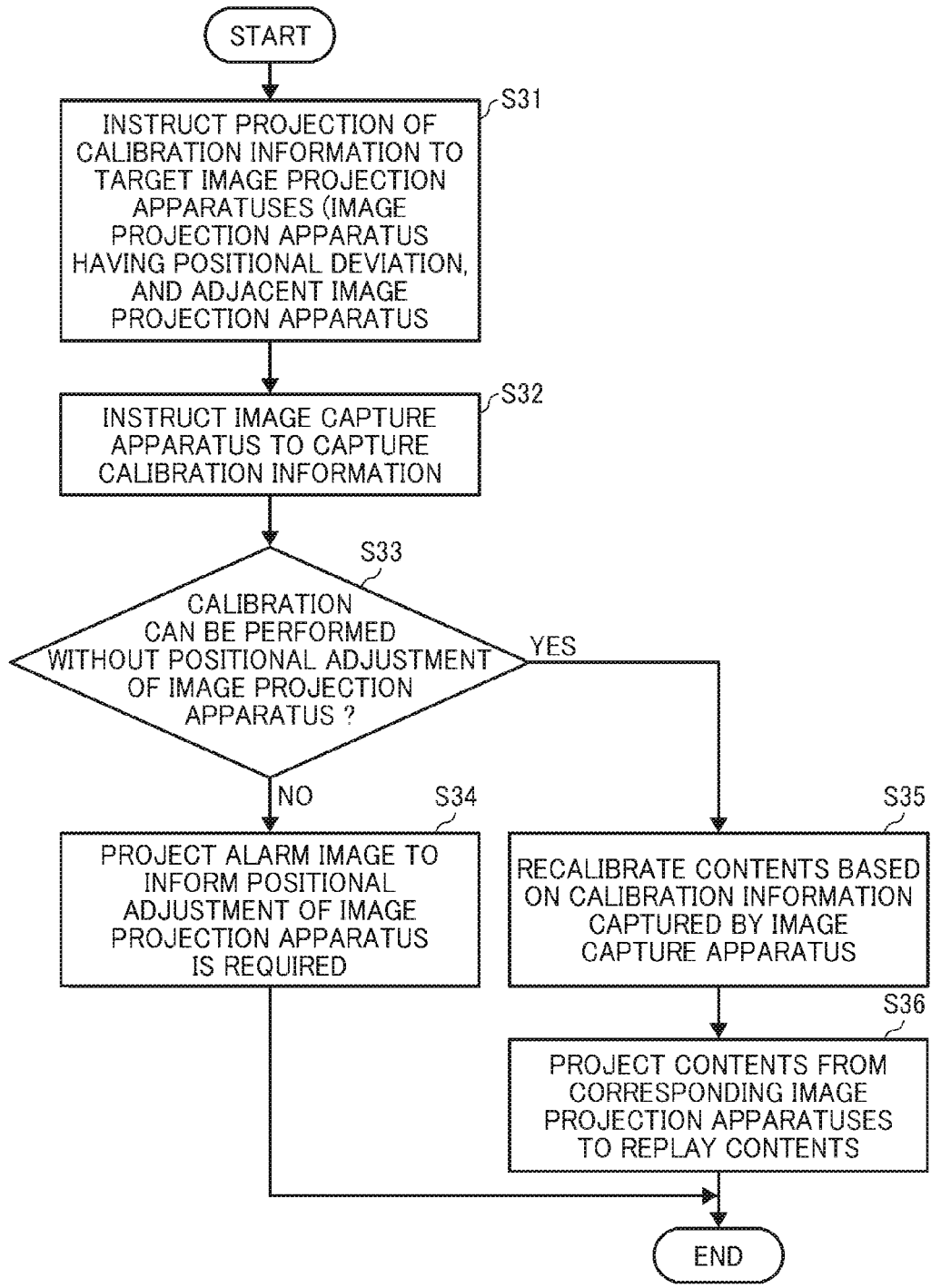

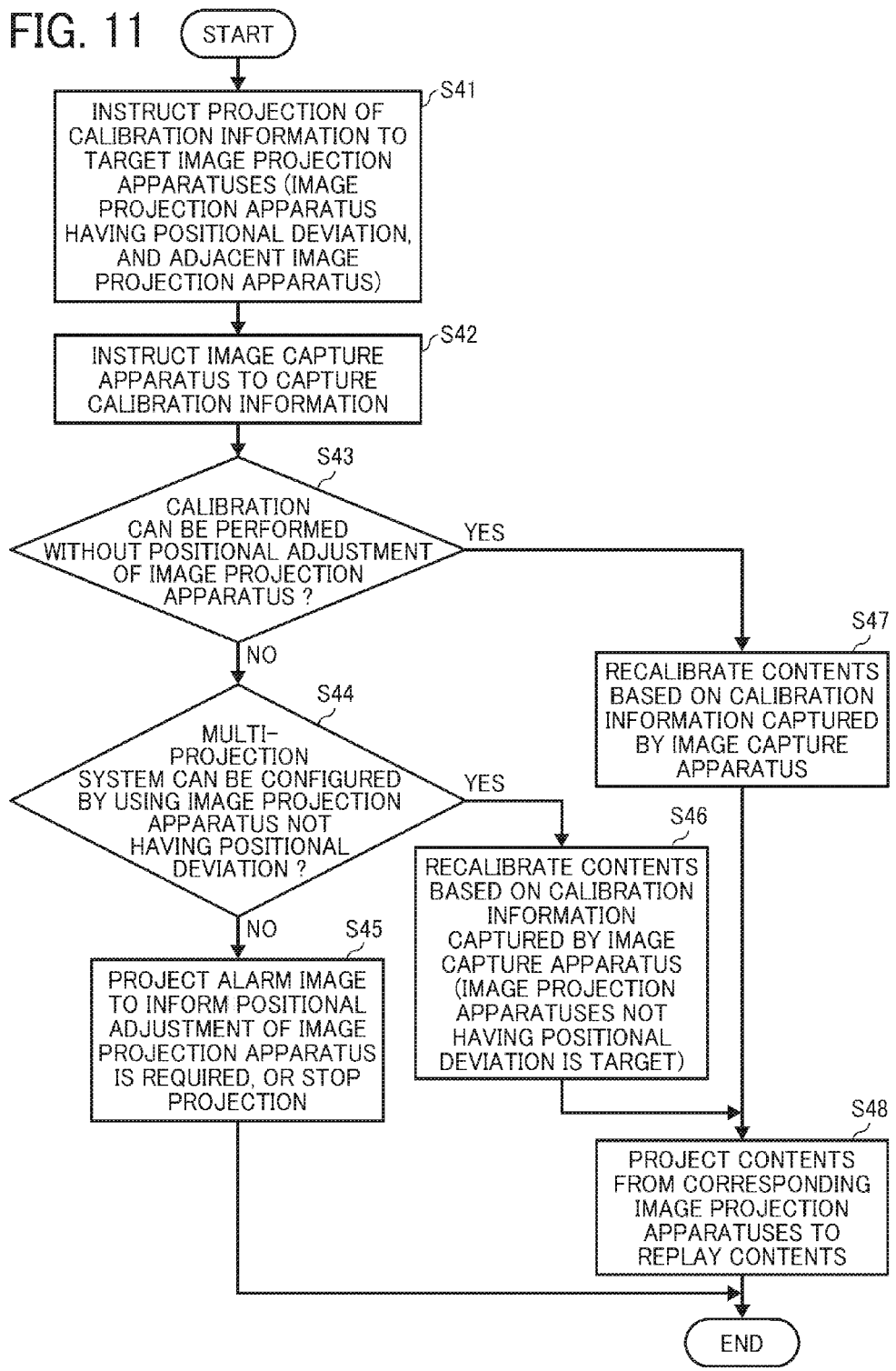

PROJECTION SYSTEM, AND INFORMATION PROCESSING APPARATUS

CROSS-REFERENCE TO RELATED APPLICATION

This application claims priority pursuant to 35 U.S.C. §119(a) to Japanese Patent Application No. 2015-055588 filed on Mar. 19, 2015 in the Japan Patent Office, the disclosure of which is incorporated by reference herein in its entirety.

BACKGROUND

Technical Field

The present invention relates to a projection system, and an information processing apparatus.

Background Art

Projection systems that can display a large screen image with a higher resolution are developed. A projection system includes a plurality of projectors connected to an information processing apparatus such as a personal computer. The information processing apparatus can transmit image information to the plurality of projectors while dividing image information into a plurality of image data, and each of the plurality of projectors projects the corresponding image data to project the image information as one screen image on a projection face. This projection system is known as a multi-projection system used, for example, as digital signage, and information boards in schools.

When the multi-projection system is used to project image information matched to a user intension, an adjustment of installation positions of the projectors and a positional adjustment (i.e., calibration processing) of projection images are required. Therefore, the adjustment of the installation positions of the projectors is performed before projecting the image information. However, after adjusting the installation positions of the projectors, the installation positions of the projectors may change if a person or object hits one or more of the projectors. In this case, a user re-adjusts the installation positions of the projectors to re-adjust the positional adjustment of projection images.

A multi-projection system that can automatically detect positional deviation of the projectors to perform the re-calibration processing of projection image is known However, in conventional projection systems, the plurality of projectors and range finding sensors to detect the positional deviations of plurality of projectors are fixed on a stand. Therefore, when the positional deviation occurs and a re-calibration processing is to be performed, the re-calibration processing is required to be performed for all of the projectors, which is not convenient for users.

SUMMARY

In one aspect of the present invention, a projection system is devised. The projection system includes a plurality of image projection apparatuses to together project one integrated image onto a projection face based on image information, a projection controller to divide the image information into a plurality of segment image data, and to instruct each one of the plurality of image projection apparatuses to project a corresponding one of the segment image data, a positional deviation detector disposed at each of the plurality of image projection apparatuses to detect a positional deviation at each of the plurality of image projection apparatuses, an identification unit to identify which image projection apparatus detects the positional deviation when the positional deviation detector detects the positional deviation to identify an image projection apparatus requiring a calibration processing; a projection unit to cause the identified image projection apparatus to project a calibration image information; an image capture apparatus to capture the calibration image information projected by the identified image projection apparatus onto the projection face; and a calibration unit to calibrate the segment image data projected by the identified image projection apparatus based on the calibration image information captured by the image capture apparatus.

In another aspect of the present invention, a projection system is devised. The projection system includes an information processing apparatus, a plurality of image projection apparatuses communicable with the information processing apparatus, the plurality of image projection apparatuses to together project one integrated image onto a projection face based on image information received from the information processing apparatus, and an image capture apparatus communicable with the information processing apparatus. Each of the plurality of image projection apparatuses includes a positional deviation detector to detect positional deviation at the image projection apparatus, a reporting unit to report the information processing apparatus with the detected positional deviation, and a projection unit to project the image information and calibration image information in response to an instruction from the information processing apparatus. The information processing apparatus includes a projection controller to divide the image information into a plurality of segment image data, and to instruct each one of the plurality of image projection apparatuses to project a corresponding one of the segment image data, an identification unit to identify which image projection apparatus detects the positional deviation when the positional deviation is reported from any one of the image projection apparatuses, a calibration unit to instruct the identified image projection apparatus identified by the identification unit to project calibration image information, to instruct the image capture apparatus to capture the calibration image information projected by the identified image projection apparatus on the projection face, to receive the calibration image information captured by the image capture apparatus, and to calibrate the segment image data projected by the identified image projection apparatus based on the received calibration image information. The image capture apparatus includes an image capture unit to capture the calibration image information projected on the projection face when the information processing apparatus instructs capturing of the calibration image information, and a transmission unit to transmit the calibration image information captured by the image capture unit to the information processing apparatus.

In another aspect of the present invention, an information processing apparatus is devised. The information processing apparatus includes a projection controller to divide image information into a plurality of segment image data, and to instruct each one of the plurality of image projection apparatuses to project a corresponding one of the divided segment image data, an identification unit to identify which image projection apparatus detects the positional deviation when any one of the image projection apparatuses reports positional deviation to the information processing apparatus; and a calibration unit to instruct the identified image projection apparatus identified by the identification unit to project calibration image information, to instruct the image capture apparatus to capture the calibration image information projected by the identified image projection apparatus on the projection face, to receive the calibration image information captured by the image capture apparatus, and to calibrate the segment image data projected by the identified image projection apparatus based on the received calibration image information.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 6 is a sequential chart of an operation in the image capture apparatus of FIG. 3;

FIG. 7 is a flowchart showing the steps of a process of detecting a positional deviation of the image projection apparatus;

FIG. 8 is a flowchart showing the steps of a process of calibrating the contents by using the projection control apparatus when the same contents is replayed repeatedly;

FIG. 9 is a flowchart showing the steps of a process of calibrating the contents by using the projection control apparatus when a user designates an image projection apparatus where a positional deviation occurs;

FIG. 10 is a flowchart showing the steps of a process of calibrating the contents by the projection control apparatus including a step of reporting that a physical position adjustment of an image projection apparatus where a positional deviation occurs is required; and FIG. 11 is a flowchart showing the steps of a process of calibrating the contents by the projection control apparatus including a step of reconfiguring the multi-projection system by using image projection apparatuses not occurring the positional deviation.

Figure 1:
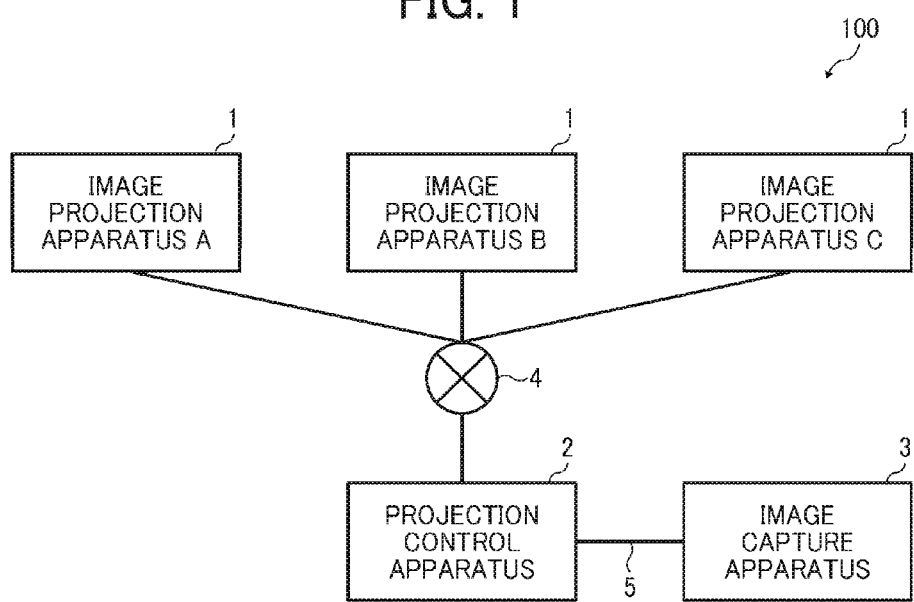
FIG. 1 is a schematic overview of a multi-projection system of one or more example embodiments of the present invention.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing views illustrated in the drawings, specific terminology is employed for the sake of clarity, the present disclosure is not limited to the specific terminology so selected and it is to be understood that each specific element includes all technical equivalents that operate in a similar manner and achieve a similar result. Referring now to the drawings, one or more apparatuses or systems according to one or more example embodiments are described hereinafter.

FIG. 1 is a schematic overview of a multi-projection system 100 of one or more example embodiments of the present invention. As illustrated in FIG. 1, the multi-projection system 100 includes, for example, three image projection apparatuses 1, a projection control apparatus 2 used as an information processing apparatus, and an image capture apparatus 3. Each of the three image projection apparatuses 1 can communicate with the projection control apparatus 2 via a network 4, and the image capture apparatus 3 can communicate with the projection control apparatus 2 via a network 5. Hereinafter, the three image projection apparatuses 1 are referred to an image projection apparatus A, an image projection apparatus B, and an image projection apparatus C. It should be noted that the numbers of the image projection apparatuses 1 is not limited to any specific number but the numbers of the image projection apparatuses 1 is at least two to configure the multi-projection system 100.

Image information stored in the projection control apparatus 2 is transmitted to the image projection apparatuses A, B and C, and the image projection apparatuses A, B and C can be used to project one image such as large image corresponding to the image information on a projection face such as a screen and wall. The "image information" means still images and movie images of films, animations, characters, figures, drawings and combinations of these information or data. Hereinafter, the "image information" is referred by "contents" or "contents data." The image capture apparatus 3 is, for example, a camera to capture calibration image information required for the calibration processing of images projected by the image projection apparatuses A, B and C.

In this description, three image projection apparatuses are used for the multi-projection system 100, but not limited hereto. The multi-projection system 100 can be configured with a plurality of image projection apparatuses 1 such as two or more image projection apparatuses 1. For example, a plurality of image projection apparatuses 1 such as four, six, eight, and nine image projection apparatuses can be disposed with a matrix pattern, and one large image can be generated by combining each of a plurality of images projected from the plurality of image projection apparatuses.

The networks 4 and 5 can employ a communication network such as wired LAN, and wireless LAN.

The image projection apparatus 1 can be used alone to project one contents (e.g., screen image of personal computer). However, one image projection apparatus has a limitation of enlarging a projection image size. Therefore, the multi-projection system 100 using a plurality of image projection apparatuses 1 to project one contents as a large projection image has been used.

However, when one contents is projected by the plurality of image projection apparatuses 1, the positions of the image projection apparatuses 1 are required to be adjusted, and an image correction such as a calibration processing is required. Since each of the image projection apparatuses 1 is used to project images corresponding to each corresponding part of the contents of a projection target image, the adjustment and the calibration processing may vary for each of the image projection apparatuses 1, and the projection target image can be projected by combining the projection images projected by each of the image projection apparatuses 1. The calibration processing can be performed with various patterns.

For example, when performing the calibration processing, a calibration image used for the calibration processing is projected from each one of the image projection apparatuses 1, and image data obtained by capturing the calibration image is analyzed by the projection control apparatus that manages the calibration processing to determine projection contents to be projected from each of the image projection apparatuses 1. However, this calibration processing needs relatively longer time. Further, after performing the calibration processing, the positions of the image projection apparatuses 1 may deviate due to some reasons such as by touching of a user. In this case, the calibration processing is required to be performed again to project the contents in line with a user's intention.

Conventionally, the re-calibration processing is performed for all of the image projection apparatuses 1. As to the multi-projection system 100 of one or more example embodiments of the present invention, the re-calibration processing is performed only to the image projection apparatus 1 that is required to be re-calibrated.

As to the multi-projection system 100 of FIG. 1, the projection control apparatus 2 divides image information (contents data) to be projected on the projection face into a plurality of data, and requests each one of the image projection apparatuses A, B, and C to project each of the divided data. For the simplicity of the expression, each of the divided data is referred to "segment data." Further, the projection control apparatus 2 determines the calibration method for each of the image projection apparatuses 1, and performs the calibration. Each of the image projection apparatuses 1 (e.g., image projection apparatuses A, B, C) has a detector to detect the positional deviation. When the positional deviation occurs at least one of the image projection apparatuses 1, the detector detects the positional deviation and reports to the projection control apparatus 2 that the positional deviation occurs. With this configuration, the projection control apparatus 2 can determine the image projection apparatus 1 that is required to be re-calibrated, and perform the re-calibration processing only to the image projection apparatus 1 that is required to be re-calibrated.

When the projection control apparatus 2 performs the calibration processing, the calibration image information is projected by only the image projection apparatus 1 that is required to be calibrated among the image projection apparatuses A, B and C. The image capture apparatus 3 captures the projected image, and transmits the captured image of the calibration image information to the projection control apparatus 2. The projection control apparatus 2 receives the calibration image information from the image capture apparatus 3, and then perform the reconfiguration of contents data (i.e., segment data) to be projected from each one of the image projection apparatuses A, B, and C based on the captured calibration image.

The image projection apparatuses 1 can employ a projector having a transmission type liquid crystal panel, which can be smaller in size, project bright image, and can be easy to adjust, but not limited hereto. The image projection apparatuses 1 can employ a projector having a reflection type liquid crystal such as liquid crystal on silicon (LCOS). The projection control apparatus 2 can employ information processing apparatuses such as a personal computer, but not limited hereto. The projection control apparatus 2 can employ a workstation, general computer, or dedicated apparatus, or the projection control apparatus 2 can be included in any one the plurality of image projection apparatuses 1. Further, image capture apparatus 3 can be included in the projection control apparatus 2.

Figure 2:
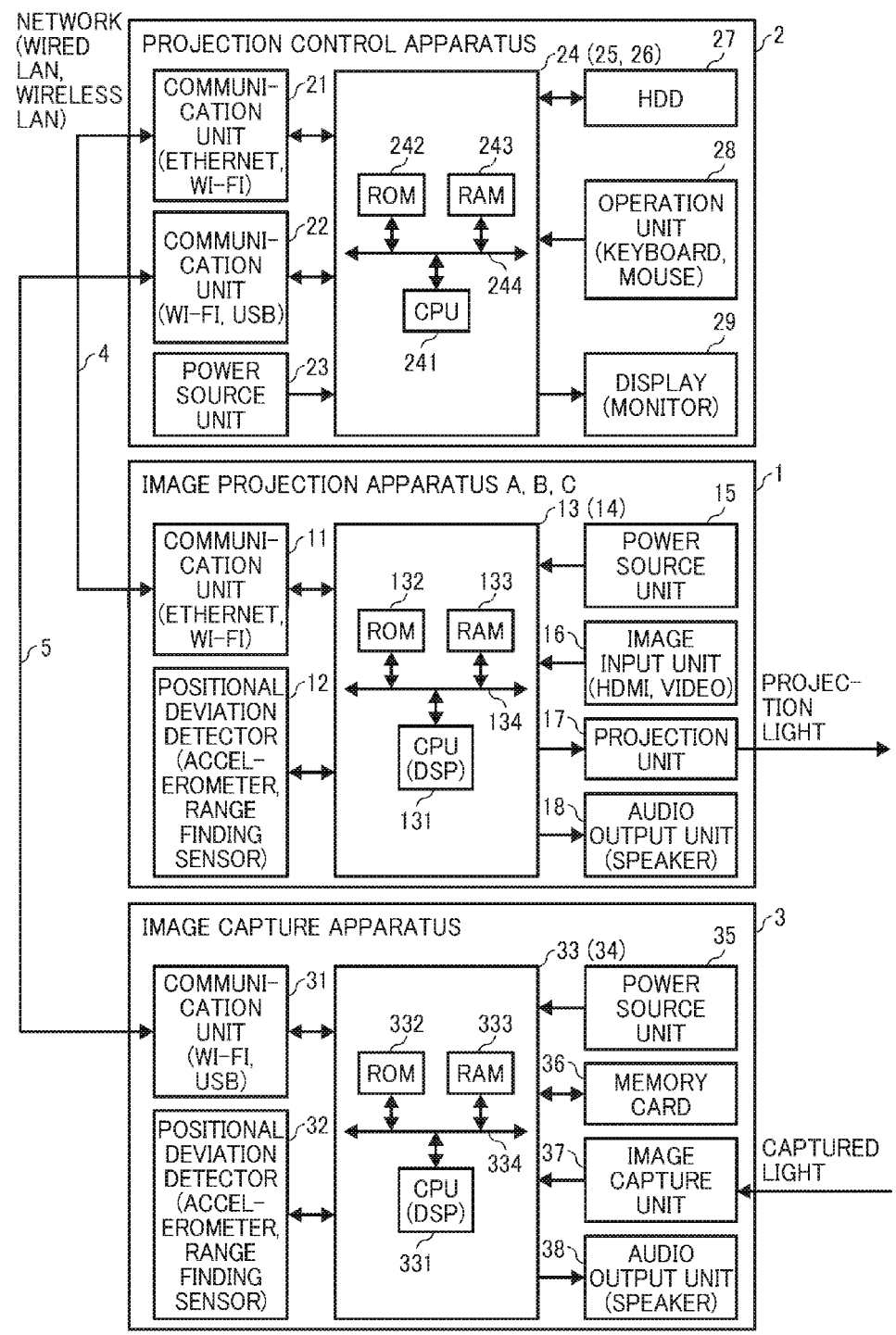
FIG. 2 is a block diagram of an image projection apparatus, a projection control apparatus, and an image capture apparatus of the multi-projection system of FIG. 1.

FIG. 2 is a block diagram of the image projection apparatuses 1, the projection control apparatus 2, and the image capture apparatus 3 of the multi-projection system 100 of FIG. 1. With referring to FIG. 2, the hardware configurations of the image projection apparatuses 1, the projection control apparatus 2 and the image capture apparatus 3 are described. The image projection apparatus 1 represents each one of the image projection apparatuses A, B, and C having the same configuration. The image projection apparatus 1 includes, for example, a communication unit 11, a positional deviation detector 12, a computing unit 13, a power source unit 15, an image input unit 16, a projection unit 17, and an audio output unit 18.

The communication unit 11 has a function of transmitting and receiving communication with external apparatuses such as the projection control apparatus 2 via the network 4 such as wired local area network (LAN) and/or wireless LAN. The communication unit 11 employs, for example, Ethernet (registered trademark) or Wi-Fi (registered trademark). When the positional deviation detector 12 detects the occurring of positional deviation, the communication unit 11 is used to report the occurring of positional deviation to the projection control apparatus 2 used as the information processing apparatus. The positional deviation detector 12 includes, for example, an accelerometer and a range finding sensor. The accelerometer measures acceleration of the image projection apparatus 1, and the range finding sensor measures a distance to a reference position such as a projection face. When the image projection apparatus 1 is moved and the positional deviation occurs, the positional deviation detector 12 detects the positional deviation of the image projection apparatus 1.

The computing unit 13 includes, a central processing unit (CPU) 131, a read only memory (ROM) 132 and a random access memory (RAM) 133 connected by a CPU bus 134 for data and signal communication. The computing unit 13 is a microcomputer. The CPU 131 is a central processing unit that performs computing and processing. The ROM 132 is a read only memory to store programs and data executable by the CPU 131. The RAM 133 is a random access memory to store data temporary, and used as a working area of the CPU 131. Further, instead of the CPU 131, a digital signal processor (DSP) can be employed.

The computing unit 13 controls the image projection apparatus 1 as a whole, and can be used as a data processing unit 14 of one or more example embodiments. The power source unit 15 includes an alternate current-direct current (AC-DC) converter and a battery to supply power to each of units such as the computing unit 13 in the image projection apparatus 1.

The image input unit 16 employs, for example, High-Definition Multimedia Interface (HDMI: registered trademark) and VIDEO interface. The image input unit 16 may be disposed with a plurality of numbers same as general image projection apparatuses to receive images such as movie and still images from the outside. The projection unit 17 includes, for example, a liquid crystal, and an optical elements such a lens. When the contents of image information or the calibration image information is output from the projection control apparatus 2, and received by the computing unit 13 used as the data processing unit 14, the projection unit 17 projects an image of the image information or the calibration image information on the projection face such as a screen. The audio output unit 18 includes a speaker, which is an electric-audio converter that converts audio signals of images output from the computing unit 13 to audio sound.

The projection control apparatus 2 is an information processing apparatus including, for example, communication units 21 and 22, a power source unit 23, a computing unit 24, a hard disk drive (HDD) 27, an operation unit 28, and a display 29. The communication unit 21 is used to communicate with the communication unit 11 of the image projection apparatus 1 via the network 4, and the communication unit 21 employs Ethernet (registered trademark) or Wi-Fi (registered trademark) same as the communication unit 11. The communication unit 22 is used to communicate with the image capture apparatus 3 via the network 5, and the communication unit 22 employs Wi-Fi (registered trademark) or universal serial bus (USB).

The power source unit 23 includes an AC-DC converter and a battery to supply power to each of units such as the computing unit 24 in the projection control apparatus 2. The computing unit 24 includes, a central processing unit (CPU) 241, a read only memory (ROM) 242 and a random access memory (RAM) 243 connected by a CPU bus 244 for data and signal communication. The computing unit 24 is a microcomputer, and has the same hardware configuration of the computing unit 13. The computing unit 24 controls the projection control apparatus 2 as a whole, and can be used as a contents controller 25 and a projection controller 26 of one or more example embodiments.

The contents controller 25 performs the calibration processing based on correction information obtained from the image capture apparatus 3. Further, the contents controller 25 divides one contents data into a plurality of segment data, and controls projection of the plurality of segment data by selecting which image projection apparatus 1 is used for projecting which segment data.

The projection controller 26 controls projection of the image projection apparatuses 1. Further, the projection controller 26 determines which image projection apparatus 1 requires the re-calibration processing when the positional deviation occurs, and controls an external apparatus used for the calibration processing. Therefore, the computing unit 24 useable as the contents controller 25 and the projection controller 26 can be used as a projection controller, an identification unit that identifies the image projection apparatus 1 that is required to be calibrated, and a calibration unit that performs the calibration processing.

The HDD 27 is a non-volatile memory of greater storage capacity such as a hard disk drive that stores contents data. The operation unit 28 is a keyboard and a mouse to receive an input operation of a user. The display 29 is a monitor such as a liquid crystal panel used by a user when the user designates the image projection apparatuses 1 that deviates the position.

The image capture apparatus 3 is a camera such as digital still camera and digital video camera. The image capture apparatus 3 captures a calibration image projected on the projection face by one or more of the image projection apparatuses 1 identified by the projection control apparatus 2. The image capture apparatus 3 includes, for example, a communication unit 31, a positional deviation detector 32, a computing unit 33, a power source unit 35, a memory card 36, an image capture unit 37, and an audio output unit 38.

The communication unit 31 is used to communicate with the communication unit 22 of the projection control apparatus 2 via the network 5, and the communication unit 31 employs Wi-Fi (registered trademark) or universal serial bus (USB) same as the communication unit 22. The communication unit 31 is used to transmit the calibration image information captured by the image capture unit 37 to the projection control apparatus 2. The positional deviation detector 32 employs an accelerometer and a range finding sensor to detect the positional deviation of the image capture apparatus 3 same as the positional deviation detector 12 of the image projection apparatus 1. The positional deviation detector 32 is a detector disposed for typical image capture apparatuses. In the one or more example embodiments, the calibration result can be corrected even if the image capture apparatus 3 deviates the position, and thereby the positional deviation detector 32 may not be used.

The computing unit 33 includes, a central processing unit (CPU) 331, a read only memory (ROM) 332 and a random access memory (RAM) 333 connected by a CPU bus 334 for data and signal communication. The computing unit 33 is a microcomputer, and has the same hardware configuration of the computing unit 13. Further, instead of the CPU 331, a digital signal processor (DSP) can be employed. The computing unit 33 controls the image capture apparatus 3 as a whole, and can be used as a data processing unit 34.

The power source unit 35 includes an AC-DC converter and a battery to supply power to each of units such as the computing unit 33 in the image capture apparatus 3. The memory card 36 is a storage medium to store captured image data such as secure digital (SD: registered trademark) card and CompactFlash (CF: registered trademark) card.

The image capture unit 37 includes an image such as charge coupled device (CCD) and complementary metal oxide semiconductor (CMOS), and an imaging forming optical system such as a lens to focus a capture image on a light receiving area on the image sensor. The image capture unit 37 captures the calibration image information projected by the image projection apparatus 1 identified by the projection control apparatus 2 that performing of the calibration processing is required. The audio output unit 38 includes a speaker, which is an electric-audio converter, which converts audio signals of images output from the computing unit 33 to audio sound.

Figure 3:
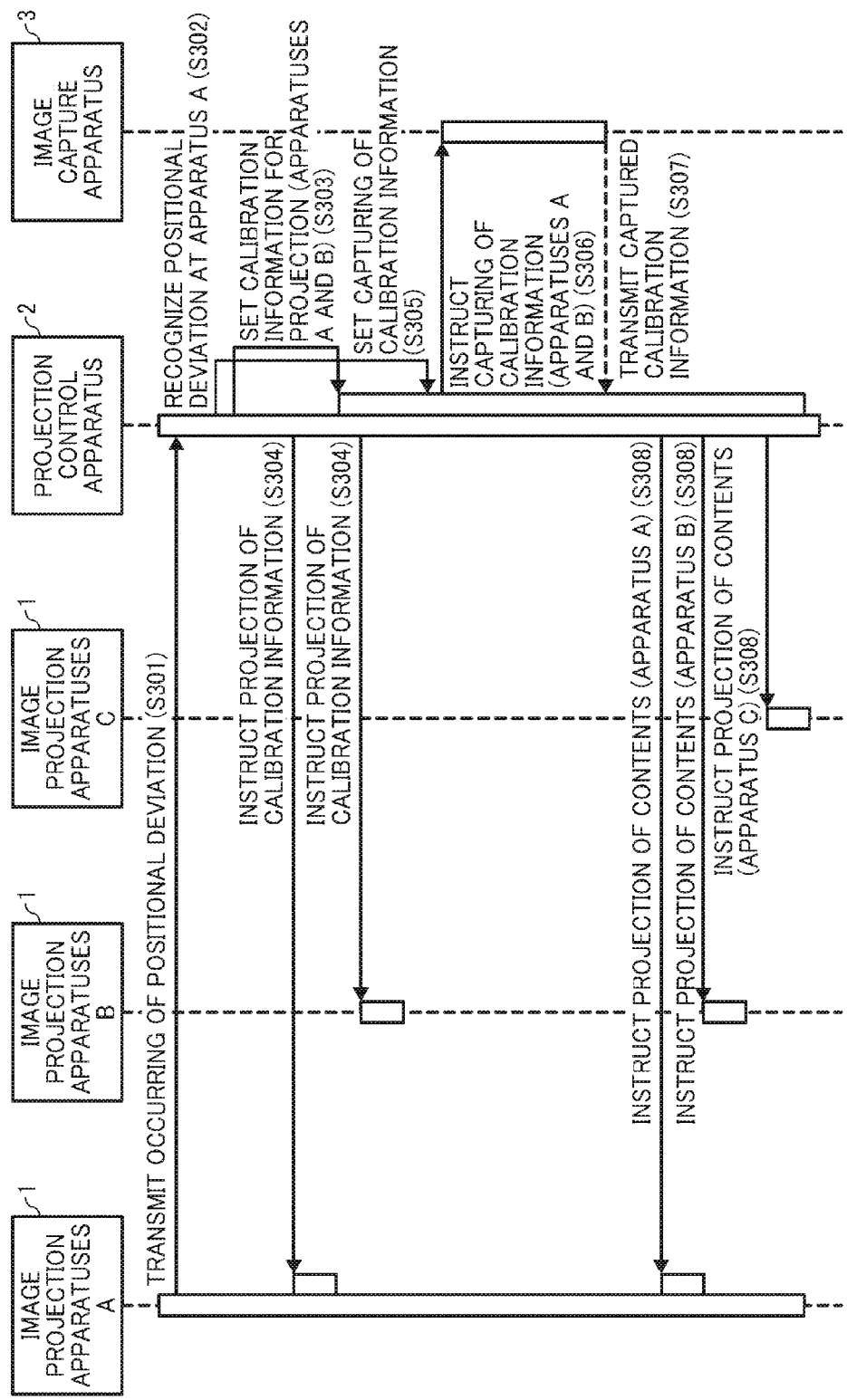
FIG. 3 is a sequential chart of an operation of a calibration processing by the multi-projection system of FIGS. 1 and 2.

A description is given of a sequential operation of the calibration processing by the multi-projection system 100 with reference to FIG. 3. FIG. 3 is a sequential chart of an operation of the calibration processing. In this example case, the image projection apparatuses A, B, and C (three image projection apparatuses 1) are arranged side by side with this sequence, and a user performs a multi-projection using the image projection apparatuses A, B, and C. Hereinafter, it is assumed that that the positional deviation occurs at the image projection apparatus A.

In this situation, the multi-projection system 100 can perform the re-calibration processing automatically, and re-project projection images correctly. Since the image projection apparatuses 1 are arranged side by side with the sequence of the image projection apparatuses A, B, and C, three projection image areas projected by the image projection apparatuses 1 are also are arranged side by side with the sequence image projection apparatuses A, B, and C on the projection face to configure one integrated image corresponding to the image information input from the projection control apparatus 2. The one integrated image may be projected as one large image. In this situation, only the contents projected by the image projection apparatus B, adjacent to the image projection apparatus A, relates to the contents of projected by the image projection apparatus A where the positional deviation occurs. Therefore, the projection of the calibration image information is required for the image projection apparatuses A and B.

With reference to FIG. 3, the sequential operation of the calibration processing by the multi-projection system 100 is described. At first, the image projection apparatus A detects that a positional deviation occurs, and then the image projection apparatus A transmits the occurring of positional deviation to the projection control apparatus 2 (S301), in which information indicating that that the positional deviation occurs at the image projection apparatus A is added.

When the projection control apparatus 2 receives the information f, the projection control apparatus 2 recognizes that the positional deviation occurs at the image projection apparatus A (S302), and the projection control apparatus 2 identifies which image projection apparatus is required to project the calibration image information by checking or referring the arrangement information of the image projection apparatuses A, B, and C. In this example case, the projection control apparatus 2 identifies that the image projection apparatuses A and B as the target image projection apparatuses that are required to project the calibration image information, and instructs the image projection apparatuses A and B to project the calibration image information (S303, S304).

Then, the projection control apparatus 2 generates or sets an instruction of capturing to be transmitted to the image capture apparatus 3 to instruct capturing of the calibration image information projected by the image projection apparatuses A and B (S305). When the image capture apparatus 3 receives the capturing instruction, the image capture apparatus 3 captures the calibration image information projected by the image projection apparatuses A and B (S306), and transmits the captured calibration image information to the projection control apparatus 2 (S307).

After receiving the captured calibration image information, the projection control apparatus 2 performs the calibration processing to the contents data previously projected by each of the image projection apparatuses A and B based on the captured calibration image information. Then, the projection control apparatus 2 instructs the image projection apparatuses A, B, and C to project reconfigured or regenerated contents data (S308). Then, each of the image projection apparatuses A, B and C can project the calibrated contents data to perform a multi-projection projection while correcting the positional deviation on the projection face.

Figure 4:
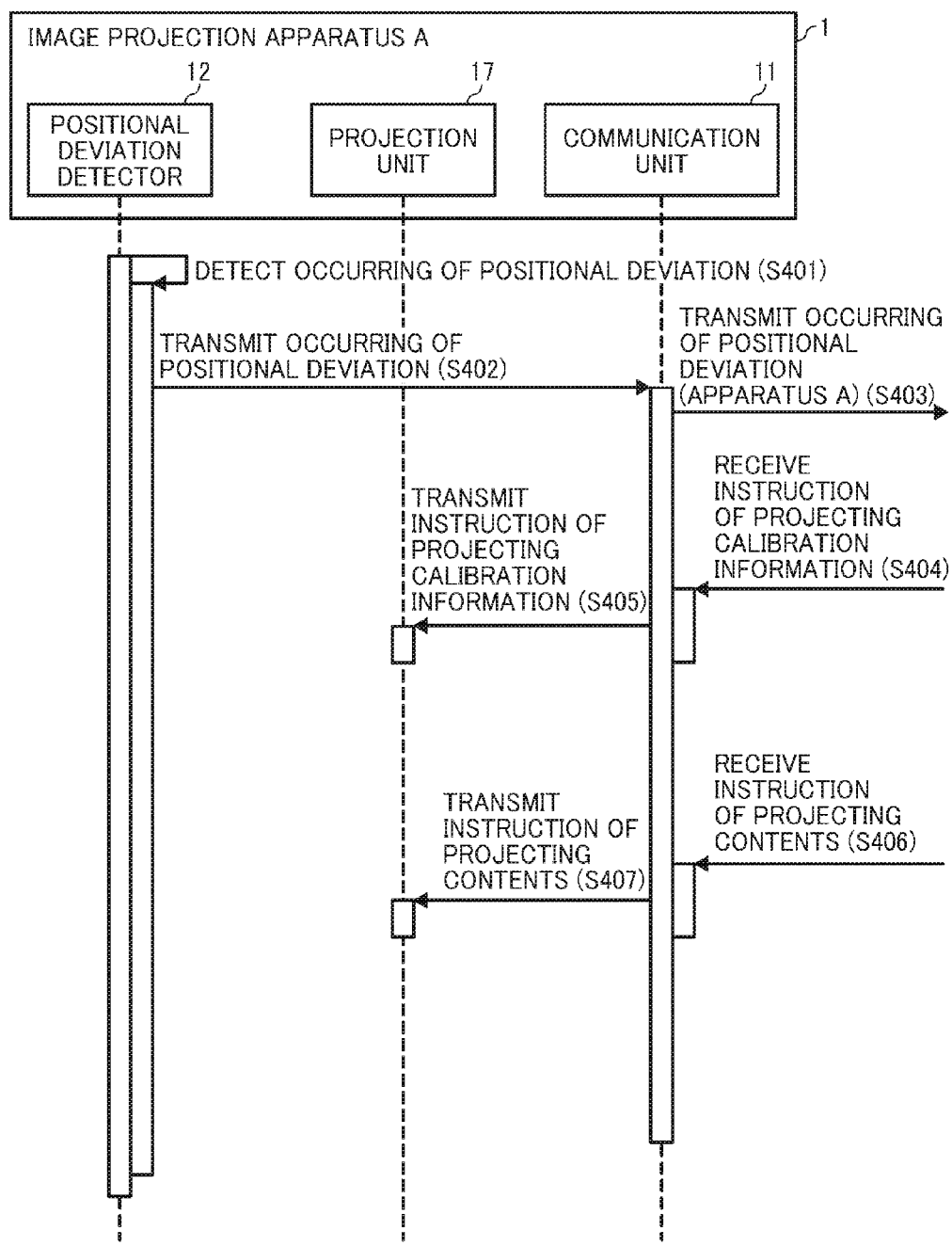
FIG. 4 is a sequential chart of an operation in the image projection apparatus of FIG. 3.

A description is given of a sequential operation by the positional deviation detector 12, the projection unit 17, and the communication unit 11 in the image projection apparatus A with reference to FIG. 4. As to the image projection apparatus A, when the positional deviation detector 12 detects the occurring of positional deviation (S401), the positional deviation detector 12 transmits the occurring of positional deviation to the communication unit 11 via the data processing unit 14 (S402). Then, the communication unit 11 transmits information indicating that the positional deviation occurs at the image projection apparatus A to the communication unit 21 of the projection control apparatus 2.

Then, the communication unit 11 receives an instruction of projecting the calibration image information set for the image projection apparatus A from the communication unit 21 of the projection control apparatus 2 (S404). The data processing unit 14 processes the instruction, and transmits the instruction to the projection unit 17 (S405). Then, the projection unit 17 projects the calibration image information set for the image projection apparatus A onto the projection face. Then, the communication unit 11 receives an instruction of projecting the contents reconfigured for the image projection apparatus A from the communication unit 21 of the projection control apparatus 2 (S406). Then, the data processing unit 14 processes the instruction, and transmits the instruction to the projection unit 17 (S407). With this processing, the projection unit 17 can project the contents reconfigured for the image projection apparatus A onto the projection face. The above described operation of FIG. 4 can be controlled by the computing unit 13 used as the data processing unit 14 (FIG. 2).

The projection unit 17 and the communication unit 11 of the image projection apparatus B also perform the similar sequential operation but the positional deviation detector 12 of the image projection apparatus B is not activated for this case. Further, the projection unit 17 and the communication unit 11 of the image projection apparatus C also perform the similar sequential operation but the positional deviation detector 12 of the image projection apparatus C is not activated for this case. Further, since the communication unit 11 of the image projection apparatus C does not receive an instruction of projecting the calibration image information set for the image projection apparatus C, the projection unit 17 of the image projection apparatus C does not project the calibration image information.

Figure 5:
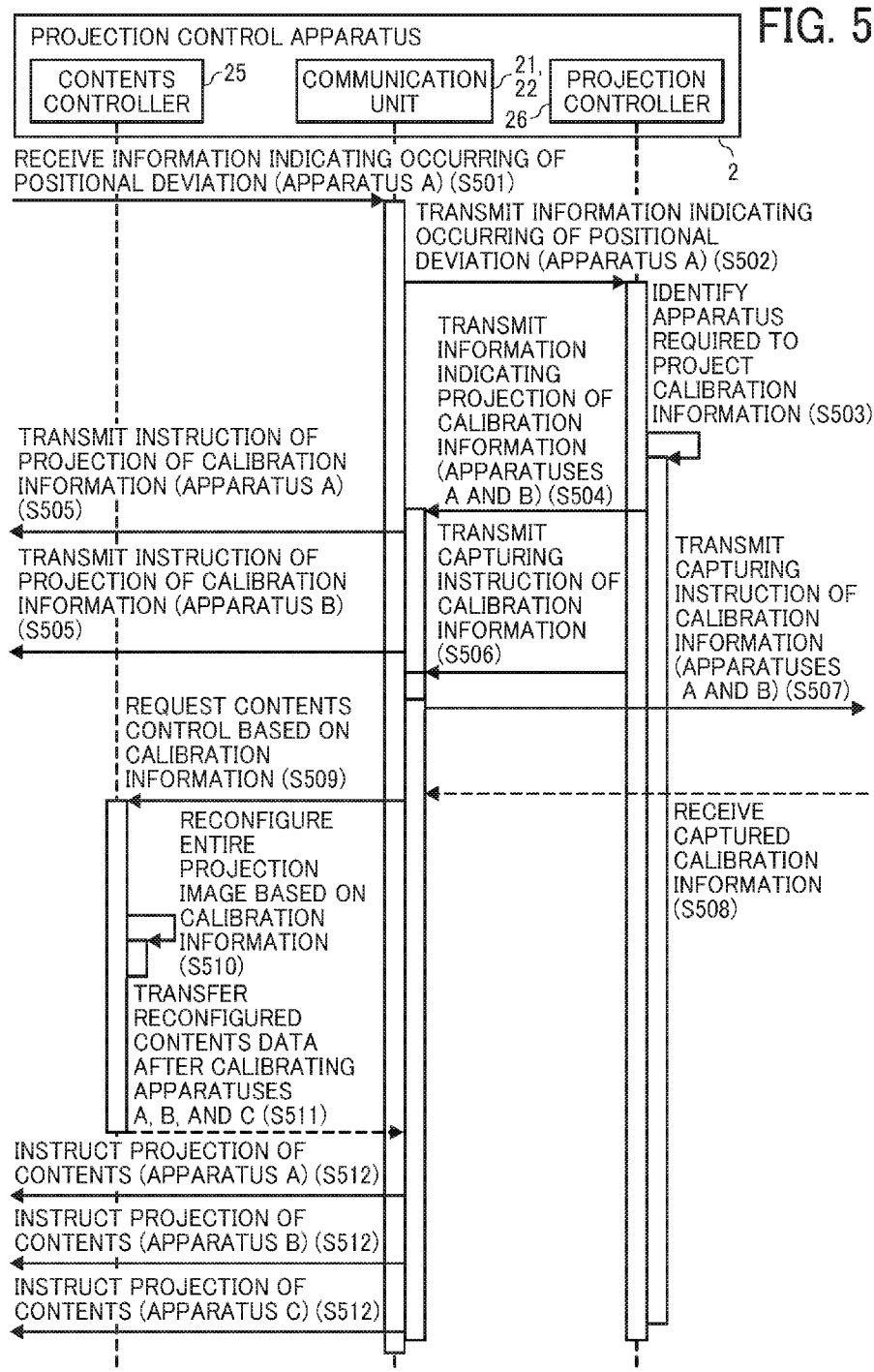
FIG. 5 is a sequential chart of an operation in the projection control apparatus of FIG. 3.

A description is given of a sequential operation by the communication unit 21, the communication unit 22, the contents controller 25, and the projection controller 26 in the projection control apparatus 2 with reference to FIG. 5. The contents controller 25 and the projection controller 26 can be implemented by the computing unit 24 shown in FIG. 2.

The communication unit 21 receives information indicating the occurring of positional deviation at the image projection apparatus A from the communication unit 11 of the image projection apparatus A (S501), and then the communication unit 21 transmits the information indicating the occurring of positional deviation to the projection controller 26 (S502). When the projection controller 26 receives the information, the projection controller 26 determines or identifies the image projection apparatus 1 that is required to project the calibration image information (S503). The projection controller 26 has the arrangement information of the image projection apparatuses A, B, and C. The projection controller 26 identifies target image projection apparatuses required to project the calibration image information based on the arrangement information and information of the image projection apparatus 1 where the positional deviation occurs. The arrangement information can be stored in the projection control apparatus 2 when each of the image projection apparatuses 1 is installed at the positions. For example, a user can set the arrangement information by using the operation unit 28 shown in FIG. 2, and the arrangement information is stored in the HDD 27.

The image projection apparatuses required to project the calibration image information means one of the image projection apparatuses 1 where the positional deviation occurs, and another image projection apparatus 1 related to the one image projection apparatuses 1, in which the contents projected by the one image projection apparatuses 1 and the contents projected by another image projection apparatuses 1 are related with each other because the one image projection apparatus 1 where the positional deviation occurs, and another image projection apparatus 1 are adjacently arranged. Table 1 indicates relevant image projection apparatuses for each of the image projection apparatuses A, B, and C (Nos. 1 to 3), in which projected contents of the image projection apparatus where the positional deviation occurs (i.e., concerned image projection apparatus) is related to projected contents of another adjacent image projection apparatuses 1. Table 1 can be stored, for example, in the HDD 27.

TABLE 1

| No | Concerned image projection apparatus | image projection apparatus relevant to concerned image projection apparatus |
|---|---|---|
| 1 | image projection apparatus A | image projection apparatus B |
| 2 | image projection apparatus B | image projection apparatuses A and C |
| 3 | image projection apparatus C | image projection apparatus B |

In this example case, the positional deviation occurs at the image projection apparatus A, and the contents projected by the image projection apparatus A relates to the contents projected by the image projection apparatus B as indicated by Table 1. Therefore, the projection controller 26 identifies the image projection apparatus A and the image projection apparatus B as the target image projection apparatuses 1 that are required to project the calibration image information. Therefore, the projection controller 26 controls processes required for projecting the calibration image information from the image projection apparatus A and the image projection apparatus B.

At first, the projection controller 26 transmits information indicating that the projection of the calibration image information by the image projection apparatuses A and B is required to the communication unit 21 (S504). Then, the communication unit 21 transmits an instruction of projecting the calibration image information to the communication unit 11 of each of the image projection apparatuses A and B (S505). Then, each of the image projection apparatuses A and B projects the calibration image information based on the instruction as above described.

Then, the communication unit 22 of the projection control apparatus 2 transmits an instruction of capturing the calibration image information projected by the image projection apparatuses A and B to the communication unit 31 of the image capture apparatus 3 (S506, S507). Then, the image capture apparatus 3 captures the calibration image information projected by the image projection apparatuses A and B based on the instruction, and then the image capture apparatus 3 transmits the captured calibration image information to the projection control apparatus 2 (S508).

When the communication unit 22 of the projection control apparatus 2 receives the captured calibration image information from the image capture apparatus 3, the communication unit 22 transmits the captured calibration image information to the contents controller 25, and requests the contents controller 25 to perform the contents control (S509).

The contents controller 25 reconfigures the contents data based on the calibration image information captured at an overlapping area between the image projection apparatuses A and B, and reconfigures the contents data to be projected by the image projection apparatuses A, B, and C (S510). The overlapping area, overlapped by one projection image projected by one image projection apparatus and another projection image projected by the adjacent image projection apparatus, may be also referred to "image stitching area." The calibration of image information at the overlapping area between the image projection apparatuses A and B can be performed by checking the "image stitching area" of the image projection apparatuses A and B. Since the contents controller 25 already has the calibration image information at an overlapping area between the image projection apparatuses B and C, the contents controller 25 can use the calibration image information at the overlapping area between the image projection apparatuses B and C, and the calibration image information at the overlapping area between the image projection apparatuses A and B, which is newly obtained, to reconfigure the contents data. The reconfiguration of contents data by using the calibration image information can be performed by known methods.

Then, the contents controller 25 transfers the calibrated contents data of each of the image projection apparatuses A, B, and C to the communication unit 21 (S511). Then, the communication unit 21 of the projection control apparatus 2 transmits an instruction of projecting the reconfigured or regenerated contents data to each one of the image projection apparatuses A, B, and C (S512). Then, the communication unit 11 of each one of the image projection apparatuses A, B, and C receives a projection instruction, and the projection unit 17 projects the calibrated contents data on the projection face to perform a multi-projection projection by correcting the positional deviation as above described.

A description is given of a sequential operation by the communication unit 31, and the image capture unit 37 in the image capture apparatus 3 with reference to FIG. 6. When the communication unit 22 of the projection control apparatus 2 transmits the instruction of capturing the calibration image information projected by the image projection apparatuses A and B, the communication unit 31 of the image capture apparatus 3 receives the capturing instruction (S601). Then, the communication unit 31 instructs the image capture unit 37 to capture the calibration image information projected by the image projection apparatuses A and B via the data processing unit 34 (S602), and then the image capture unit 37 captures the calibration image information projected by the image projection apparatuses A and B.

The image capture unit 37 transmits the captured calibration image information (i.e., captured result) to the communication unit 31 via the data processing unit 34 (S603). Then, the communication unit 31 of the image capture apparatus 3 transmits the captured calibration image information to the communication unit 22 of the projection control apparatus 2 (S604). The operation shown in FIG. 6 can be controlled by the computing unit 33 used as the data processing unit 34 shown in FIG. 2.

The image projection apparatus 1 can include the range finding sensor to perform the auto focus adjustment based on the distance to the projection face. Further, the image projection apparatus 1 can include the accelerometer to automatically prevent the falling down and to automatically perform the projection image correction when the apparatus is inclined. As to the above described example embodiments, the range finding sensor and the accelerometer can be employed for the positional deviation detector 12. A description is given of a process of detecting the positional deviation of the image projection apparatus 1 with reference to FIG. 7. FIG. 7 is a flowchart showing the steps of a process of detecting the positional deviation of the image projection apparatus 1.

The computing unit 13 of each of the image projection apparatuses 1 (A, B, C) shown in FIG. 2 repeats the sequence of FIG. 7 to perform a detection process of the positional deviation (steps S02 to S04 of FIG. 7) with a given time interval such as one second interval. When this sequence starts, it is determined whether the time interval passes at step S01. If the time interval does not pass, the sequence ends. Then, other processes are performed if required, and then the sequence is started again.

If it is determined that the time interval passes at step S0, the sequence proceeds to step S02, in which a value of the range finding sensor (distance measurement value), and a value of the accelerometer (acceleration measurement value) are read. At step S03, it is determined whether the positional deviation occurs. The occurring of the positional deviation can be determined by using the measurement value of the range finding sensor and the measurement value of the accelerometer. Specifically, it is checked whether at least one of the measurement value of the range finding sensor and the measurement value of the accelerometer exceeds a pre-set threshold, different from the initial setting values.

Preferably, it is determined that the positional deviation occurs when the measurement value of the range finding sensor or the measurement value of the accelerometer exceeds the threshold for a given time period (e.g., one second) or more, or when the measurement value of the range finding sensor or the measurement value of the accelerometer exceeds the threshold for a given number of times (e.g., two times) consecutively. With this configuration, even if a user touches the image projection apparatuses 1 by mistake and the image projection apparatuses 1 is shaken a little but no positional deviation occurs at the image projection apparatuses 1, it is not determined that the positional deviation does not occur, with which the false detection of the positional deviation can be prevented.

If the computing unit 13 of the image projection apparatus 1 determines that the positional deviation occurs (S03: YES), the computing unit 13 reports the projection control apparatus 2 that that the positional deviation occurs via the network communication at step S04, and ends the sequence. If the computing unit 13 of the image projection apparatus 1 determines that the positional deviation does not occur (S03: NO), the computing unit 13 ends the sequence. With this configuration, when a digital signage is projecting the contents continuously without an administrator, the positional deviation can be detected automatically, and the calibration processing can be performed as required.

When the projection contents stored in the projection control apparatus 2 such as a personal computer (PC) is used for the digital signage, the projection contents may be replayed repeatedly. In this case, to avoid the calibration processing during the continuous projection of the projection contents, the calibration processing is performed at a timing after one continuous projection of the projection contents is ended and before the next continuous projection of the projection contents is started. FIG. 8 is a flowchart showing the steps of a process of calibrating the contents by using the computing unit 24 of the projection control apparatus 2.

A user can pre-set information required for the contents replay to the projection control apparatus 2. The required information includes, for example, target projection contents and the number of repeat times of replaying times. The projection control apparatus 2 can perform the sequence of FIG. 8 when one cycle of the contents replay is completed. At first, at step S11, the computing unit 24 determines whether the projection contents is replayed repeatedly for a given number of times by referring the setting information of the repeat times of the target contents. If the computing unit 24 determines that the same projection contents is repeatedly replayed for the given number of times, the sequence proceeds to step S12. If the computing unit 24 determines that the same projection contents is not repeatedly replayed for the given number of times, the sequence ends.

At step S12, the projection control apparatus 2 transmits a position measurement instruction to each of the image projection apparatuses 1 via the network communication. Then, each of the image projection apparatuses 1 measures values (e.g., acceleration, distance from the projection face) for detecting the position of the image projection apparatus 1 by using the positional deviation detector 12 (FIG. 2), and transmits a result of measurement such as the positional deviation information indicating whether the positional deviation occurs to the projection control apparatus 2. Then, at step S13, the projection control apparatus 2 receives the positional deviation information from each of the image projection apparatuses 1 via the network communication.

At step S14, the projection control apparatus 2 determines whether the positional deviation occurs, in which the projection control apparatus 2 determines whether the calibration processing is required to be performed again. When the positional deviation occurs at any one of the plurality of image projection apparatuses 1, the projection control apparatus 2 determines that the positional deviation occurs, and proceeds to step S15. If the positional deviation does not occur at any one of the plurality of image projection apparatuses 1, the projection control apparatus 2 determines that the positional deviation does not occur, and proceeds to step S18, and at step S18, the projection control apparatus 2 instructs each of the image projection apparatuses 1 to project and replay the same projection contents data previously used, and ends the sequence.

At step S15, since the calibration processing is required to be performed again, the projection control apparatus 2 instructs a projection of the calibration image information to the target image projection apparatuses 1. The target image projection apparatuses 1 includes one image projection apparatus 1 where the positional deviation occurs, and another adjacent image projection apparatus 1. In this example case, three image projection apparatuses 1 are used for the multi-projection system 100.

As described with reference to Table 1, the image projection apparatus 1 where the positional deviation occurs, and the adjacent image projection apparatus 1 adjacent to the positional-deviation-occurred image projection apparatuses 1 become the target of the re-calibration processing. Therefore, when the positional deviation occurs at the image projection apparatus A, the overlapping area between the image projection apparatuses A and B becomes the target of the re-calibration processing while the overlapping area between the image projection apparatuses B and C can use the positional deviation information stored already.

When the positional deviation occurs at the image projection apparatus B, an overlapping area between the image projection apparatuses A and B, and an overlapping area between the image projection apparatuses B and C become the target of the re-calibration processing, in which the positional deviation information stored already cannot be used.

When the positional deviation occurs at the image projection apparatus C, an overlapping area between the image projection apparatuses B and C becomes the target of the re-calibration processing while an overlapping area between the image projection apparatuses A and B can use the positional deviation information stored already. If the already-stored positional deviation information can be used, the time required for the calibration processing can be shortened for the already-stored positional deviation information.

When the projection control apparatus 2 instructs the projection of the calibration image information to the target image projection apparatuses 1 at step S15, each of the target image projection apparatuses 1 projects the corresponding calibration image information onto the projection face. At step S16, the projection control apparatus 2 instructs the image capture apparatus 3 to capture the calibration image information projected from the target image projection apparatuses 1.

Then, the image capture apparatus 3 captures the projected calibration image information, and transmits the captured calibration image information to the projection control apparatus 2 via the network communication. At step S17, the projection control apparatus 2 receives the calibration image information captured by the image capture apparatus 3, and performs the re-calibration processing to the same projection contents data used for the previous projection based on the captured calibration image information. Then, at step S18, the projection control apparatus 2 instructs each of the image projection apparatuses 1 to project and replay the projection contents data calibrated by the re-calibration processing, and the sequence ends. With this configuration, if a positional adjustment of the image projection apparatuses 1 is not required, the calibration processing (i.e., correction) can be performed between one cycle of the repeated replaying and a next cycle of the repeated replaying, with which the continuous projection of the contents can be replayed repeatedly without interrupting the continuous projection of the contents.

As to the multi-projection system 100, the installation of the apparatuses are handled by a trained person because the calibration processing of a multi-projection system is a complex work. Further, when the multi-projection system 100 is installed, other works such as covering cables and PCs connected to the apparatuses are also complex works. As to the one or more example embodiments, a specific user (e.g., administrator) can perform the calibration processing to the target image projection apparatuses 1 at a given time that requires the calibration processing. FIG. 9 is a flowchart showing the steps of a process of calibrating the contents by using the computing unit 24 of the projection control apparatus 2 when a user designates an image projection apparatus where a positional deviation occurs.

In this sequence, at step S21, the specific user designates the image projection apparatus 1 where the positional deviation occurs to the projection control apparatus 2, and the subsequent process of steps S22 to S25 are same as steps S15 to S18 of FIG. 8. For example, it can be identified whether a user is a specific user by using a user code and password input from the operation unit 28 (FIG. 2). The specific user can designate the image projection apparatus 1 where the positional deviation occurs by using the operation unit 28.

In this case, the projection control apparatus 2 performs the calibration processing only to the target image projection apparatuses 1 designated by the specific user, in which the target image projection apparatuses 1 includes the image projection apparatus 1 where the positional deviation occurs, and the adjacent image projection apparatus 1. With this configuration, the calibration processing can be performed only to the target image projection apparatuses 1 designated by the specific user when the specific user determines that the calibration processing (i.e., correction) is required for the target image projection apparatuses 1, with which the continuous projection can be performed for a long period time without performing the calibration processing.

When the sequence of FIG. 9 is combined with the sequence of FIG. 8, the projection control apparatus 2 can perform the calibration processing when the occurring of positional deviation is reported from the image projection apparatuses 1, or when the specific user designates the image projection apparatuses 1 where the positional deviation occurs by using an external device such as the operation unit.

When the re-calibration processing is to be performed, the positional deviation of the image projection apparatus 1 may be too great in some cases, and thereby the calibration processing cannot be completed correctly if a physical position adjustment of the image projection apparatus 1 is not performed. In this case, a message indicating that physical position adjustment of the image projection apparatus 1 is required can be reported to a user from the projection face. FIG. 10 is a flowchart showing the steps of a process of calibrating the contents by using the computing unit 24 of the projection control apparatus 2 including a step of reporting that a physical position adjustment of an image projection apparatus where a positional deviation occurs is required.

When the projection control apparatus 2 starts the sequence of FIG. 10, the process of steps S31 and S32 are same as steps S15 and S16 of FIG. 8. Specifically, the projection control apparatus 2 instructs the target image projection apparatuses 1 to project the calibration image information at step S31. The target image projection apparatuses 1 include the image projection apparatuses 1 where the positional deviation occurs, and the adjacent image projection apparatuses 1.

When the projection control apparatus 2 instructs the target image projection apparatuses 1 to project the calibration image information at step S31, each of the target image projection apparatuses 1 projects the corresponding calibration image information onto the projection face. At step S32, the projection control apparatus 2 instructs the image capture apparatus 3 to capture the calibration image information. After the image capture apparatus 3 captures the projected calibration image information, the image capture apparatus 3 transmits the captured calibration image information to the projection control apparatus 2 via the network communication.

Then, at step S33, the projection control apparatus 2 determines whether the calibration processing can be performed by using the calibration image information received from the image capture apparatus 3 without performing the positional adjustment of the image projection apparatus 1 where the positional deviation occurs. The calibration image information is, for example, a pattern image such as a grid pattern image, and a dot-matrix image. When the calibration images projected from the image projection apparatuses 1 are overlapped, the overlapping area is required to satisfy a specific condition. The specific condition means that a peripheral area of each of the projection images used for the calibration processing projected by two adjacent image projection apparatuses 1 are overlapped as nested structure while the pattern images are not overlapped.

If the projection control apparatus 2 determines that the calibration processing can be performed without performing the positional adjustment of the image projection apparatus 1 where the positional deviation occurs (step S33: YES), which means if the projection control apparatus 2 determines that the calibration processing can be performed based on the acquired calibration image information, the sequence proceeds to step S35, and the projection control apparatus 2 performs the re-calibration processing of the contents at step S35. At step S35, the projection control apparatus 2 performs the re-calibration processing of the contents based on the calibration image information captured by the image capture apparatus 3. Then, at step S36, the projection control apparatus 2 instructs each of the image projection apparatuses 1 to project and replay the calibrated contents data, and the sequence ends.

If the projection control apparatus 2 determines that the calibration processing is impossible without performing the positional adjustment of the image projection apparatuses 1 where the positional deviation occurs (step S33: NO), the sequence proceeds to step S34. At step S34, the projection control apparatus 2 instructs the image projection apparatuses 1 to project an alarm image such as a message of "adjust position" to inform a user that the positional adjustment of the image projection apparatuses 1 is required, and the sequence ends. The alarm image can be projected on a large image projected by using all of the plurality of image projection apparatuses 1, or the alarm image can be projected on a screen by using only the image projection apparatus 1 where the positional deviation occurs.

For example, the alarm image can be projected on the screen by projecting the alarm image on a specific area by high-lighting the alarm image compared to the contents while replaying the contents continuously. With this configuration, a user can be informed that the positional adjustment is required for the image projection apparatus 1 from the projection image of the contents.

A description is given of another case that the positional deviation of the image projection apparatuses 1 is too great when the re-calibration processing is to be performed, in which the calibration processing cannot be completed correctly without performing the positional adjustment of the image projection apparatus 1 where the positional deviation occurs. In this another case, if a multi-projection system can be reconfigured by using the image projection apparatuses 1 not occurring the positional deviation, the multi-projection system is reconfigured to replay the projection contents. FIG. 11 is a flowchart showing the steps of a process of calibrating the contents by using the computing unit 24 of the projection control apparatus 2 including a step of reconfiguring the multi-projection system by using the image projection apparatuses not occurring the positional deviation.

When the projection control apparatus 2 starts the sequence of FIG. 11, steps S41 to S43 of FIG. 11 are same as steps S31 to S33 of FIG. 10. Further, if the projection control apparatus 2 determines that the calibration processing can be performed without performing the positional adjustment of the image projection apparatus 1 where the positional deviation occurs (step S43: YES), steps S47 and S48 of FIG. 11 are same as steps S35 and S36 of FIG. 10.

However, if the projection control apparatus 2 determines that the calibration processing cannot be performed without performing the positional adjustment of the image projection apparatus 1 where the positional deviation occurs (step S43: NO), the sequence proceeds to step S44. At step S44, the projection control apparatus 2 determines whether a multi-projection system can be configured by using the image projection apparatuses 1 not occurring the positional deviation.

If the projection control apparatus 2 determines that the multi-projection system can be configured by using the image projection apparatuses 1 not occurring the positional deviation (S44: YES), the sequence proceeds to step S46. At step S46, the projection control apparatus 2 performs the calibration processing of the contents based on the calibration image information captured by the image capture apparatus 3. In this case, the adjacent image projection apparatus 1 not occurring the positional deviation is the target of the calibration processing. Then, at step S48, the projection control apparatus 2 instructs each of the image projection apparatuses 1 not occurring the positional deviation to project and replay the calibrated contents data, and the sequence ends.

By contrast, if the projection control apparatus 2 determines that the multi-projection system cannot be configured by using the image projection apparatuses 1 not occurring the positional deviation (S44: NO), the sequence proceeds to step S45. At step S45, the projection control apparatus 2 instructs one or more of the image projection apparatuses 1 to project an alarm image to inform a user that the positional adjustment of the image projection apparatus 1 is required, or the projection is stopped, and then the sequence ends.

In the sequence of FIG. 11, the flow path of processes changes depending on the position of the image projection apparatus 1 where the positional deviation occurs in the arrangement pattern of the image projection apparatuses 1 configuring the multi-projection system 100. For example, a case arranging the three image projection apparatuses A, B and C for the multi-projection system 100 with this order is described. If the multi-projection system 100 can be configured by using the remaining image projection apparatuses 1 not occurring the positional deviation, the multi-projection system 100 can be reconfigured although the projection size of the multi-projection system 100 becomes smaller.

When the positional deviation occurs at the image projection apparatus A, the multi-projection system 100 can be reconfigured by using the image projection apparatuses B and C. Further, when the positional deviation occurs at the image projection apparatus C, the multi-projection system 100 can be reconfigured by using the image projection apparatuses A and B. However, when the positional deviation occurs at the image projection apparatus B, the image projection apparatuses 1 not occurring the positional deviation are not adjacent with each other, and thereby the remaining image projection apparatuses 1 cannot be used for reconfiguring the multi-projection system 100. Therefore, the multi-projection system 100 cannot be reconfigured by using the remaining image projection apparatuses 1 not occurring the positional deviation.

Therefore, when the positional deviation occurs at the image projection apparatus B is too great and thereby the positional adjustment of the image projection apparatuses 1 is required, the alarm message informing that the positional adjustment of the image projection apparatus 1 is required is displayed clearly on the screen. Further, when the projected contents is distorted greatly at a position of the image projection apparatus B, a user may want to stop the contents projection, in which the projection by the image projection apparatuses 1 can be ended.

Further, when the positional deviation occurs at the image projection apparatus A or C is too great, and thereby the positional adjustment of the image projection apparatuses 1 is required, the multi-projection system 100 can be continued by using the remaining two image projection apparatuses 1 not occurring the positional deviation, in which the multi-projection is reconfigured by using the two images projected from the remaining projection apparatuses.

With this configuration, even if the positional deviation occurs at the specific image projection apparatus is too great, the multi-projection system can be reconfigured by using the remaining image projection apparatuses 1 not occurring the positional deviation in some cases, and the contents projection can be continued without the interruption. As to the one or more of the example embodiment of the present invention, the projection control apparatus 2 can be used as the information processing apparatus and computer. The programs of the one or more of the example embodiments of the present invention can be used to implement the projection control apparatus 2 as the projection controller, the identification unit, and the calibration unit. The programs of the one or more of the example embodiment of the present invention can be described by the flowcharts of FIGS. 8 to 11.

As to the one or more of the example embodiment of the present invention, the image projection apparatus may be a projector or others. The number of the image projection apparatuses to configure the system can be any numbers as long as one integrated image can be configured. Further, functions of the projection control apparatus 2 (i.e., information processing apparatus) such as the projection controller, the identification unit, and the calibration unit can be disposed in any one of a plurality of image projection apparatuses 1, or in the image capture apparatus 3. Further, the multi-projection system can be configured with various patterns depending the use and purpose.

As to the one or more of the example embodiment of the present invention, when the positional deviation occurs at an image projection apparatus, and the re-calibration processing is required, the re-calibration processing is performed only to the image projection apparatuses requiring the re-calibration processing.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC) and conventional circuit components arranged to perform the recited functions.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

What is claimed is:

1. A projection system comprising:
   a plurality of image projection apparatuses to together project one integrated image onto a projection face based on image information;
   a projection controller to divide the image information into a plurality of segment image data, and to instruct each one of the plurality of image projection apparatuses to project a corresponding one of the segment image data;
   a positional deviation detector disposed at each of the plurality of image projection apparatuses to detect a positional deviation at each of the plurality of image projection apparatuses;
   an identification unit to identify which image projection apparatus detects the positional deviation when the positional deviation detector detects the positional deviation to identify an image projection apparatus requiring a calibration processing;
   a projection unit to cause the identified image projection apparatus to project a calibration image information;
   an image capture apparatus to capture the calibration image information projected by the identified image projection apparatus onto the projection face; and
   a calibration unit to calibrate the segment image data projected by the identified image projection apparatus based on the calibration image information captured by the image capture apparatus.

2. The projection system of claim 1, wherein the positional deviation detector measures at least one of an acceleration and a distance to the projection face with a given time interval, and determines whether the positional deviation occurs based on a measurement value of the at least one of the acceleration and the distance.

3. The projection system of claim 1, wherein the identification unit identifies one of the plurality of image projection apparatuses that the positional deviation is detected, and one of the plurality of image projection apparatuses that is adjacent to the image projection apparatus that the positional deviation is detected, as the target image projection apparatuses requiring the calibration processing.

4. The projection system of claim 1, wherein when an image projection apparatus is designated as an image projection apparatus where the positional deviation occurs, the identification unit identifies the designated image projection apparatus, and an adjacent image projection apparatus adjacent to the designated image projection apparatus as the target image projection apparatuses requiring the calibration processing.

5. A projection system comprising:
an information processing apparatus;
a plurality of image projection apparatuses communicable with the information processing apparatus, the plurality of image projection apparatuses to together project one integrated image onto a projection face based on image information received from the information processing apparatus; and
an image capture apparatus communicable with the information processing apparatus,
wherein each of the plurality of image projection apparatuses includes:
  a positional deviation detector to detect positional deviation at the image projection apparatus;
  a reporting unit to report the information processing apparatus with the detected positional deviation; and
  a projection unit to project the image information and calibration image information in response to an instruction from the information processing apparatus,
wherein the information processing apparatus includes:
  a projection controller to divide the image information into a plurality of segment image data, and to instruct each one of the plurality of image projection apparatuses to project a corresponding one of the segment image data;
  an identification unit to identify which image projection apparatus detects the positional deviation when the positional deviation is reported from any one of the image projection apparatuses; and
  a calibration unit to instruct the identified image projection apparatus identified by the identification unit to project calibration image information, to instruct the image capture apparatus to capture the calibration image information projected by the identified image projection apparatus on the projection face, to receive the calibration image information captured by the image capture apparatus, and to calibrate the segment image data projected by the identified image projection apparatus based on the received calibration image information, wherein the image capture apparatus includes:
    an image capture unit to capture the calibration image information projected on the projection face when the information processing apparatus instructs capturing of the calibration image information; and
    a transmission unit to transmit the calibration image information captured by the image capture unit to the information processing apparatus.

6. The projection system of claim 5, wherein when the calibration unit determines that the calibration processing is impossible without a positional adjustment of the identified image projection apparatus where the positional deviation occurs, the information processing apparatus instructs the identified image projection apparatus to project an image informing that the positional adjustment of the identified image projection apparatus is required.

7. The projection system of claim 5, wherein when the calibration unit determines that the calibration processing is impossible without a positional adjustment of the identified image projection apparatus where the positional deviation occurs, the information processing apparatus determines whether the projection system can be reconfigured by using remaining image projection apparatuses, excluding the identified image projection apparatus where the positional deviation occurs, and the information processing apparatus instructs the remaining image projection apparatuses to project the one integrated image when the information processing apparatus determines that the projection system can be reconfigured by using the remaining image projection apparatuses.

8. An information processing apparatus comprising:
a projection controller to divide image information into a plurality of segment image data, and to instruct each one of the plurality of image projection apparatuses to project a corresponding one of the divided segment image data;
an identification unit to identify which image projection apparatus detects the positional deviation when any one of the image projection apparatuses reports positional deviation to the information processing apparatus; and
a calibration unit to instruct the identified image projection apparatus identified by the identification unit to project calibration image information, to instruct the image capture apparatus to capture the calibration image information projected by the identified image projection apparatus on the projection face, to receive the calibration image information captured by the image capture apparatus, and to calibrate the segment image data projected by the identified image projection apparatus based on the received calibration image information.

* * * * *